Aug. 23, 1966     L. J. HAMMAN     3,267,922
RELEASE MECHANISM FOR STARTER
Filed June 20, 1963
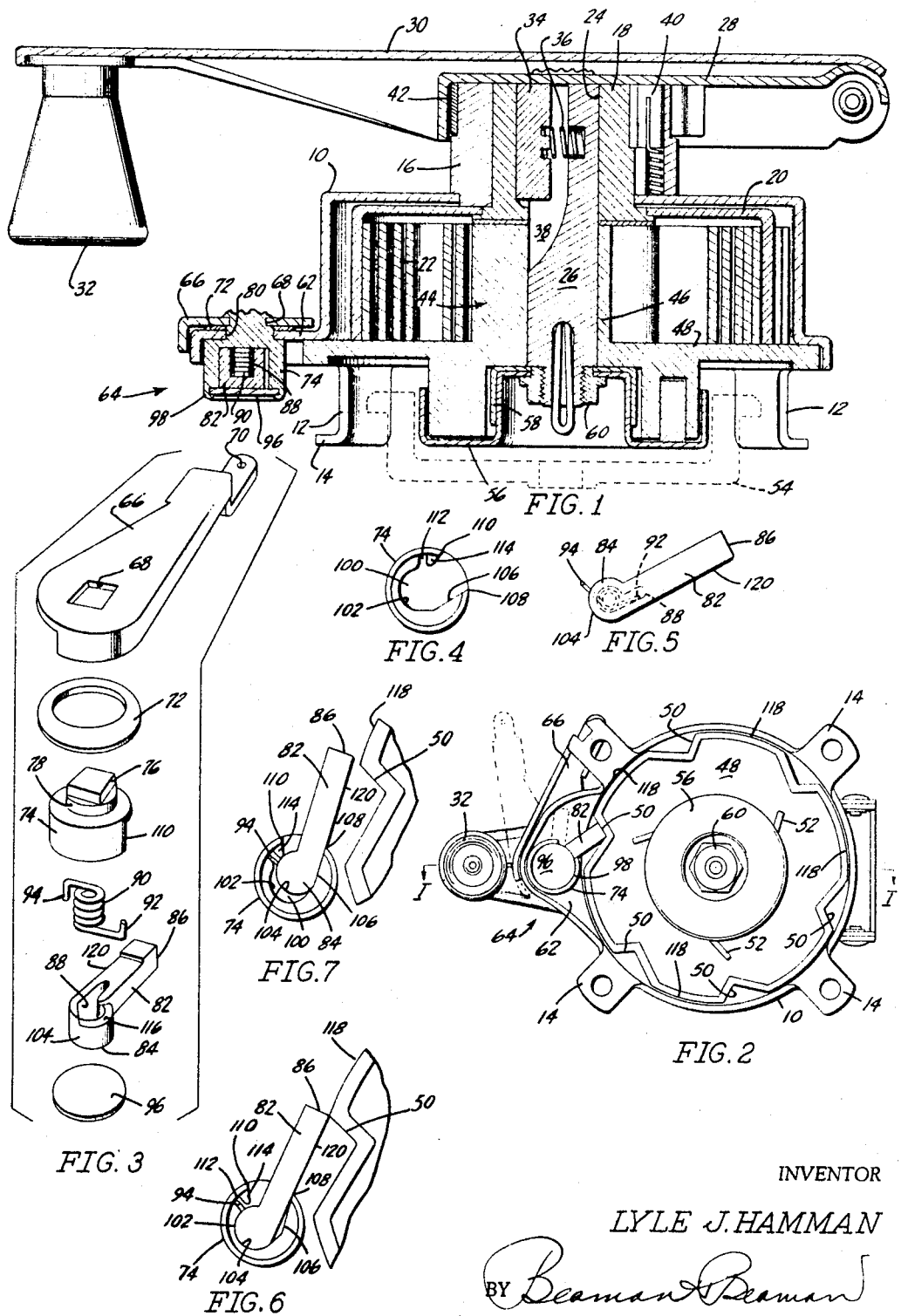
INVENTOR
LYLE J. HAMMAN
BY Beaman & Beaman
ATTORNEY

United States Patent Office 3,267,922
Patented August 23, 1966

3,267,922
RELEASE MECHANISM FOR STARTER
Lyle J. Hamman, Eaton Rapids, Mich., assignor to Eaton Stamping Company, Eaton Rapids, Mich., a corporation of Michigan
Filed June 20, 1963, Ser. No. 289,355
6 Claims. (Cl. 123—179)

The invention pertains to a spring starter for internal combustion engines, and particularly relates to the release mechanism for a spring starter.

Spring starters are often used on internal combustion engines employed with power lawnmowers, small tractors, etc. Such spring starters commonly include a housing adapted to be mounted on the engine. A drive member is rotatably supported within the housing having clutch means adapted to associate with an engine crankshaft component for cranking the engine. A spring is located within the housing and is operably associated with the drive member. A crank is employed for winding the spring. Release means are employed to prevent rotation of the drive member during winding of the spring, whereby the drive member may be released upon the spring being fully wound, and a rapid cranking action is produced.

Commonly, the release mechanism for this type of spring starter includes a release dog adapted to be selectively positioned within the path of movement of the drive member or that of a member driven by the drive member. Abutments are mounted on the drive member or member driven thereby, one of which will operatively engage the release dog. In that the torque produced by the starter spring is considerable, release of the drive member by operation of the releasing mechanism permits the drive member to rotate at a very high initial velocity. Due to the high rotative velocity of the drive member, problems have arisen with regard to the retraction of the release dog from the path of abutment movement, in that occasionally the release dog may sufficiently clear the associated abutment which prevents rotation of the drive member yet, due to manufacturing tolerances or bearing wear within the drive member, the path of movement of the following drive member abutment may slightly extend radially further from the axis of driving member rotation than the abutment previously released. In such instance, the following abutment may engage the end of the release dog and strike the dog a sharp blow, causing undesirable noise, stress, and tending to damage the end of the dog, as well as the edge of the drive member abutment. Repeated blows on the release dog of this type radius the inner corner of the release dog and eventually affect the ability of the release dog to perform its function.

It is an object of the invention to provide a release mechanism for spring starters wherein upon disengagement of the release dog from a drive member abutment, the release dog automatically retracts from the path of movement of the drive member abutments.

Another object of the invention is to provide a release mechanism for spring starters wherein the release dog may be manually positioned between operative and inoperative positions by a release lever and support member, and the release dog automatically positions itself relative to the support member upon disengagement from a drive member abutment, whereby the abutment-engaging end of the release dog is withdrawn from the path of movement of the drive member abutments.

A further object of the invention is to provide a release mechanism for spring starters having a release dog support member and a release dog wherein spring means are interposed between the support member and release dog so that the release dog may automatically shift relative to the support member upon a load being removed from the release dog.

Yet another object of the invention is to provide a release mechanism for spring starters having a release dog support member and a release dog wherein a release dog is mounted on the support member and is positionable between first and second positions thereof, said release dog being maintained in said first position by a load being imposed thereon and being biased toward the second position by spring means.

These and other objects of the invention arising from the details and relationships of the components of an embodiment thereof will be apparent from the following description and accompanying drawings wherein:

FIG. 1 is an elevational, diametrical, sectional view of a spring starter employing a release mechanism is accord with the invention, FIG. 2 is an underside view of the spring starter of FIG. 1 illustrating the release mechanism in the operative position in full lines and the release mechanism in the inoperative "released" position in dotted lines, FIG. 3 is an exploded, perspective view of the components of the release mechanism in accord with the invention, FIG. 4 is a view of the underside of the support member illustrating the recess therein, FIG. 5 is an underside view of the release dog employed with the release mechanism of the invention, FIG. 6 is an enlarged, detail, underside view of the support member, release dog, and drive member abutment, with the lower support member cap removed, illustrating the relationship of the components immediately prior to the disengagement of the release dog and abutment, and FIG. 7 is an enlarged, detail view similar to FIG. 6 illustrating the relationship of the support member, release dog, and drive member abutment immediately after release of the drive member wherein no rotation of the support member has taken place relative to that illustrated in FIG. 6.

The basic components of a spring starter which may employ the improved release mechanism will be apparent from FIG. 1 wherein a spring starter housing 10 is shown having downwardly extending legs 12 which are adapted to be affixed to an engine housing or shroud by bolts or other fasteners extending through openings in the horizontal flanges 14 of the legs. A cylindrical bearing member 16 is concentrically affixed to the upper portion of the housing 10, and is provided with a bore in which a rotatable member 18 is supported. The rotatable member 18 is connected to a cup-shaped spring keeper 20 enclosing a spiral spring 22 having one end affixed to the keeper. The rotatable member 18 is provided with a concentric bore 24 in which a shaft 26 is rotatably supported. A crank is operatively associated with the upper end of the shaft 26 and includes a handle portion 28, to which the end of the shaft 26 is affixed, and a foldable portion 30 having a crank knob 32 attached thereto. Unidirectional ratchet apparatus is mounted within the shaft 26 adapted to associate with ratchet teeth formed in the bore of the rotatable member 18, whereby rotation of the crank in a spring-winding direction rotates the rotatable member 18 and the spring keeper 20 to wind the spring 22. The ratchet apparatus consists of a plate 34 and a spring 36 radially supported within a slot 38 defined in the shaft 26. A spring-biased dog 40 is mounted within the bearing member 16 adapted to operatively associate with notches defined on the exterior of the rotatable member 18 to limit rotation of the rotatable member in a spring-winding direction. Also, a brake band 42 may be mounted on the crank handle portion 28 circumscribing the bearing member 16 to lock the crank and shaft 26 against rotation when the handle portion 30 is in the folded position.

A drive member 44 is rotatably supported on the lower portion of the shaft 26 and includes a hub portion 46 to which the inner end of the spring 22 is drivingly connected. The drive member 44 also includes a horizontally extending portion 48 on which the spiral spring rests, and abutment notches 50 are defined on the periphery of the drive member portion 48. The lower extending portion of the drive member 44 constitutes the support for clutch dogs 52, FIG. 2, adapted to engage the engine cup 54, shown in dotted lines in FIG. 1, when the drive member is rotated by the spring during starting. A dog retainer 56 and a friction brake element 58 are associated with the end of the shaft 26 by means of a nut 60 threaded on the lower threaded portion of the shaft.

The above described construction, except for the plate 34 and spring 36, is quite similar to the spring starter structure shown in my United States Patent No. 3,081,-760, and the details and relationships of the above described components will be appreciated in greater detail from this patent. The housing 10 includes an outwardly extending portion 62 upon which the release mechanism, generally indicated at 64, is mounted. The release mechanism includes a lever 66 of stamped construction having a rectangular hole 68 defined therein, and an outer end having a hole 70 defined therein, whereby a Bowden wire or other remote control means may be associated therewith for operation of the lever, if desired. A conical spring washer 72 may be interposed between the underside of the lever 66 and the upper side of the spring housing portion 62, FIG. 1, to maintain a rattle-free assembly of the release mechanism on the spring housing.

The release structure also includes a button or release dog support member 74 of a generally cylindrical configuration, having an upper projection terminating in a rectangular end 76 for reception into the rectangular opening 68 of the lever 66. As will be apparent from FIG. 1, the rectangular support member end 76 is peened or swaged to the lever 66, whereby the support member is firmly affixed to the lever for rotation therewith. The cylindrical portion 78 of the support member projection functions as a bearing within the cylindrical hole 80 of the housing portion 62.

A release dog 82 is supported by the support member 76 and includes a bulbous end 84 and an abutment-engaging end 86. A spring-receiving recess 88 is defined within the release dog for reception of the spiral torsion spring 90. The spring 90 includes an end 92 adapted to be located within the release dog 82, and an end 94 adapted to operatively cooperate with the support member 74, as will be described later.

The release dog 82 is maintained within the support member 74 by a cap 96 which is positioned on the underside of the support member and is maintained in position by swaging over the substantially annular lip 98 of the support member, FIG. 1.

The support member 74 is provided with a recess 100 of unique configuration. The recess 100 includes a substantially cylindrical surface 102 of a configuration substantially corresponding to the cylindrical surface 104 of the release dog bulbous end 84. The recess 100 also includes a substantially planar surface portion 106, and the recess 100 intersects the side wall of the support member at edges 108 and 110. A radially extending recess 112 is defined in the support member intersecting the recess 100 and functions to receive the end 94 of the spring 90. A projection 114 is defined adjacent the recess 100 which closes the "throat" of the recess and maintains the bulbous end of the release dog within the recess 100. The dog 82 is relieved at 116 to permit the spring end 94 to project from recess 88 and not interfere with the dog operation or assembly within recess 100.

The components of the release mechanism 64 are assembled as will be apparent from FIGS. 1, 2, 3, 6, and 7. The spring 90 is shaped so that the ends 92 and 94 are related to bias the release dog to the position shown in FIG. 7 when no load is being imposed on the recess dog. It is to be understood that as the bulbous end 84 is substantially cylindrical and is loosely received within the recess 100, which is of a larger diameter than the bulbous end 84, the release dog 82 is capable of freely pivoting within the recess 100 within the limits defined by the edges 108 and 110.

When the release lever 66 is pivoted to the full line position of FIG. 2, the release dog 82 will be positioned within the path of movement of the abutments 50 and, thus, will engage one of the abutments 50, as shown in FIG. 2. If, upon initially pivoting of the release lever 66 to the operative full line position of FIG. 2, the release dog end 86 engages one of the outer peripheral sections 118 of the drive member portion, the release dog 82 will pivot relative to support 74 and "ride" along the periphery of the engaged drive member section 118 until rotation of the drive member 44 aligns one of the notches 50 with the release dog end 86, whereby the dog may pivot to the full line position of FIG. 2. Under these circumstances, the biasing action produced by the spring 90 tends to bias the release dog in a clockwise direction against the engaged section 118, FIG. 2, and will permit the release dog to engage the first abutment 50 which aligns with the release dog. This feature permits the release lever 66 to be pivoted to the operative position even though the dog end 86 may not initially be aligned with an abutment 50.

After the release lever and the release dog are located as shown in FIG. 2, the operator rotates the crank 28–30 to wind the spring 22. When it is desired to start the engine, the operator pivots the release lever 66 to the dotted line position of FIG. 2. Such action causes engagement of the support member edge 108 with the release dog edge 120 and, thus, pivots the release dog 82 out of engagement with the associated abutment 50 releasing the drive member 44 to crank the engine.

Upon the operator winding the spring 22, the release dog 82 becomes loaded and the force imposed on the release dog moves the release dog bulbous end 84 against the support member surface 102, as shown in FIG. 6. In this position the angular relationship of the release dog 82 to the support member 74 is determined by the surfaces 102 and 104 and the engagement of the support member edge 108 with the edge 120 of the release dog. It will be noted that release dog edge 120 is tangent to cylindrical surface 104. FIG. 6 illustrates this position of the release mechanism components immediately prior to disengagement of the release dog from the engaged abutment 50. Upon the abutment-engaging end 86 of the release dog disengaging from the engaged abutment 50, the spring 90 returns the release dog 82 to the position shown in FIG. 7, with respect to the recess 100. In this relationship, the release dog side 120 engages the recess planar surface 106 and the resultant "shifting" of the release dog within the recess 100 has changed the angular relationship between the release dog and the support member 74, as the release dog has now rotated counterclockwise, FIG. 7, with respect to the position shown in FIG. 6. This counterclockwise rotation of the release dog relative to the support member produced by the spring 90, the recess surface 106, and the dog edge 120 retracts the release dog abutment end 86 from the path of movement of the drive member 44 and the outer edges of the abutments 50 thereof, insuring that the release dog will not be engaged by abutments passing thereby. FIG. 6 illustrates the release mechanism components at the instant the dog end 86 is preparing to disengage the associated abutment 50 and when the dog 82 is still preventing rotation of the drive member 44. FIG. 7 shows the relationship immediately after the dog has disengaged the notch 50. No rotation of support member 74 has occurred between the dog positions shown in FIGS. 6 and 7. After the release dog has "cleared" the drive member abutments 50, as shown in FIG. 7, the release lever 66 and support member 74 are usually pivoted to the full inoperative position shown in the dotted lines of FIG. 2.

It will be appreciated that the above described relationships produce an automatic retracting movement of the release dog from the path of the drive member abutments as soon as the release dog disengages the associated drive member abutment to release the drive member and permit rotation thereof. Thus, whether operation of the release mechanism by the release lever 66 is accomplished directly or by remote control, damage to the release dog is prevented due to the operator providing a slow or partial rotation of the release lever, which would permit the release dog to disengage from the associated abutment, but would not rotate the release dog out of the path of movement of other abutments approaching the release dog.

It is appreciated that modifications to the disclosed embodiment may be apparent to those skilled in the art without departing from the spirit and scope thereof, and it is intended that the invention be defined only by the scope of the following claims.

I claim:

1. A spring starter for internal combustion engines comprising, in combination,
    (a) a housing adapted to be mounted on an internal combustion engine,
    (b) spring winding means rotatably mounted on said housing,
    (c) a drive member rotatably mounted on said housing,
    (d) a drive spring connected to said spring winding means and said drive member,
    (e) a release dog support mounted on said housing selectively movable between operative and inoperative positions,
    (f) a release dog mounted on said release dog support,
    (g) abutment means defined on said drive member adapted to be selectively engaged by said release dog, and
    (h) means automatically shifting said release dog relative to said release dog support to clear said release dog from the path of said abutment means rotation upon disengagement of said release dog from said abutment means when said release dog is preventing rotation of said drive member.

2. A spring starter for internal combustion engines comprising, in combination,
    (a) a housing adapted to be mounted on an internal combustion engine,
    (b) spring winding means rotatably mounted on said housing,
    (c) a drive member rotatably mounted on said housing,
    (d) a drive spring connected to said spring winding means and said drive member,
    (e) a release dog support movably mounted on said housing selectively movable between operative and inoperative positions,
    (f) a release dog mounted on said release dog support,
    (g) abutment means defined on said drive member adapted to be selectively engaged by said release dog,
    (h) means mounting said release dog on said release dog support permitting relative movement of said release dog between first and second positions relative to said release dog support, and
    (i) spring means biasing said release dog from said first position to said second position upon disengagement of said release dog from said abutment means to permit rotation of said drive member, thereby clearing said release dog from the path of abutment means rotation.

3. A spring starter for internal combustion engines comprising, in combination,
    (a) a housing adapted to be mounted on an internal combustion engine,
    (b) spring winding means rotatably mounted on said housing,
    (c) a drive member rotatably mounted on said housing,
    (d) a drive spring connected to said spring winding means and said drive member,
    (e) a release dog support movably mounted on said housing selectively movable between operative and inoperative positions,
    (f) abutment means defined on said drive member,
    (g) a recess defined in said release dog support having first and second release dog positioning surfaces defined thereon,
    (h) a release dog mounted on said release dog support having an abutment means engageable portion and an enlarged portion received within said recess and movable therein whereby said release dog is positionable between first and second positions relative to said support, said dog assuming said first position within said recess upon said release dog engaging said abutment means to prevent rotation of said drive member and assuming said second position upon said release dog disengaging said abutment means, said release dog abutment means engaging portion being disposed further from the axis of rotation of said drive member when said dog is in said second position than when in said first position, and
    (i) spring means biasing said release dog toward said second position.

4. Spring starter release dog apparatus for use with a movable member having an abutment associated therewith comprising, in combination,
    (a) a release dog support member,
    (b) means movably mounting said release dog support member for movement between operative and inoperative positions relative to the movable member abutment,
    (c) a release dog directly mounted on said support member having an abutment-engaging end, said release dog being shiftable between first and second positions with respect to said support member, the load imposed on said release dog when operative, maintaining said release dog in said first position, and
    (d) a spring directly interposed between said release dog and said support member biasing said release dog toward said second position, movement of said release dog from said first position to said second position locating said release dog abutment-engaging end further from the path of movement of the abutment of the movable member than when said release dog is in said first position.

5. Spring starter release dog apparatus comprising, in combination,
    (a) a release dog support member,
    (b) means movably mounting said release dog support member for movement between operative and inoperative positions,
    (c) a release dog movably mounted directly on said support member movable between first and second positions with respect thereto,
    (d) cooperating positioning means defined on said support member and said release dog adapted to selectively position said release dog relative to said support member whereby upon said release dog becoming loaded said release dog assumes said first position, and
    (e) spring means directly interposed between said support member and said release dog biasing said release dog to said second position when said release dog is unloaded.

6. Spring starter release dog apparatus comprising, in combination,
(a) a release dog support member,
(b) means pivotally mounting said release dog directly upon said support member for movement between operative and inoperative positions,
(c) a recess defined in said support member formed by a socket portion and a slot opening into the socket portion,
(d) a release dog having a bulbous end and an abutment-engaging end, said bulbous end being movably received within said socket portion and abutment-engaging end movably confined within and projecting from said slot and said recess, and
(e) spring means interposed between and connecting said support member and said release dog and directly biasing said release dog toward an unloaded position in a direction outwardly of said recess, said release dog being positioned at a loaded position in a direction inwardly of said recess when under load.

References Cited by the Examiner
UNITED STATES PATENTS

| | | | |
|---|---|---|---|
| 2,597,334 | 5/1952 | Johnson | 123—185 |
| 2,869,531 | 1/1959 | Cedarmark | 123—185 |
| 2,976,959 | 3/1961 | Husted | 123—179 |
| 3,055,351 | 9/1962 | Sirvek | 123—179 |
| 3,081,760 | 3/1963 | Hamman | 123—179 |

MARK NEWMAN, *Primary Examiner.*
RICHARD B. WILKINSON, *Examiner.*
L. M. GOODRIDGE, *Assistant Examiner.*